Dec. 26, 1950     R. T. HODGES, SR     2,535,575
LICENSE HOLDER FOR REARVIEW AUTOMOBILE MIRRORS
Filed July 24, 1947
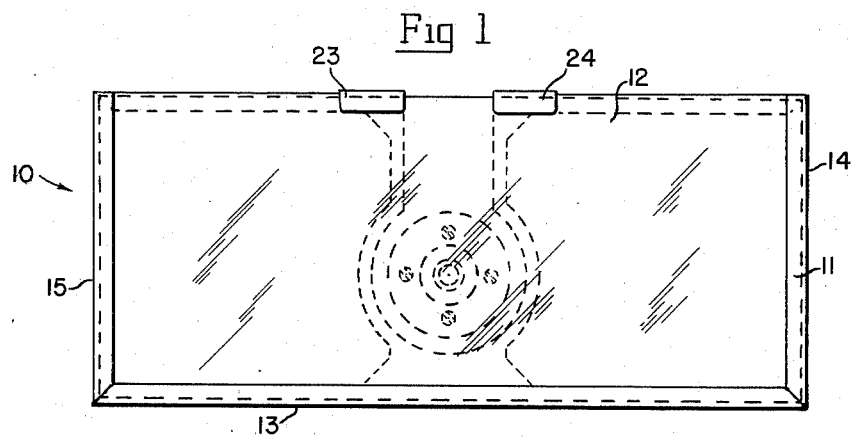
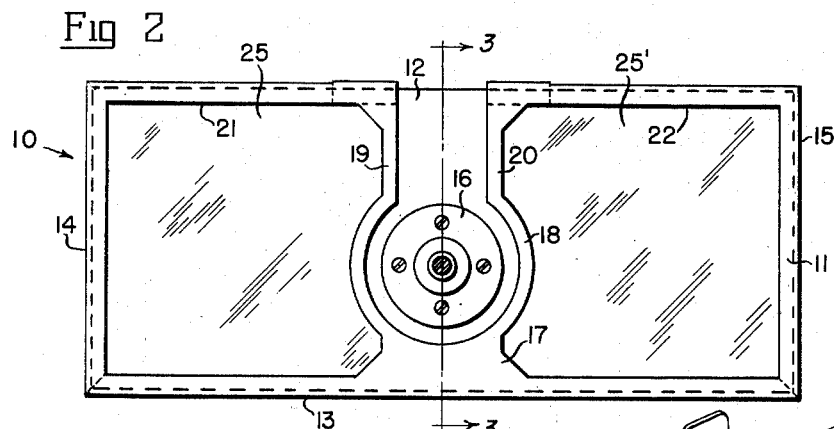
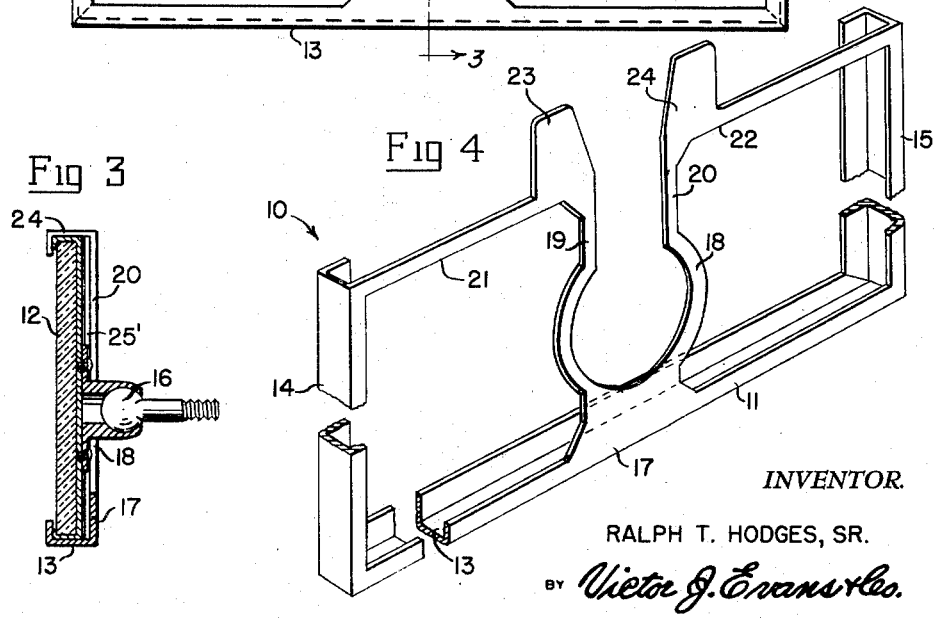
INVENTOR.
RALPH T. HODGES, SR.
BY *Victor J. Evans & Co.*
ATTORNEYS Patented Dec. 26, 1950

2,535,575

UNITED STATES PATENT OFFICE 2,535,575

LICENSE HOLDER FOR REARVIEW AUTOMOBILE MIRRORS

Ralph T. Hodges, Sr., Bristol, Tenn.

Application July 24, 1947, Serial No. 763,418

2 Claims. (Cl. 40—16)

This invention relates to a holder which, applied to a rear view mirror of a motor vehicle, will retain tax stickers, registration cards or any other type of licenses that are required to be carried, in plain view in the vehicle.

At the present time, in some localities, stickers are applied to the windshields of motor vehicles by State laws. These stickers, as well as registration cards for the vehicles, must be carried and in plain view at all times. The stickers must be applied in a position to be visible, as well as in a position to permit full vision for the driver of the vehicle.

An object of the invention, therefore, is to provide a holder which, applied to the rear view mirror of a motor vehicle, will retain the stickers therein, in plain view exteriorly of the vehicle, and out of the vision of the driver.

A uniform location for the stickers and cards is thus provided. It prevents the stickers from being lost when the windshield to which they are usually applied is washed or from condensation on the windshield.

Another object of the invention is to provide a holder that is simple in construction, inexpensive to manufacture and can be easily attached or detached from the rear view mirror of a motor vehicle.

With the above and other objects and advantages in view, the invention consists of the novel details of construction, arrangement and combination of parts more fully hereinafter described, claimed and illustrated in the accompanying drawing in which:

Figure 1 is a front view of a rear view mirror of a motor vehicle with the holder embodying the invention mounted thereon;

Figure 2 is the same of a rear view of the rear view mirror;

Figure 3 is a sectional view on the line 3—3 of Figure 2 and

Figure 4 is a perspective view of the holder, per se.

Referring more in detail to the drawing, the holder embodying the invention is designated by the numeral 10. The holder 10 comprising a U-shaped frame 11 of channel formation, which is of a size and shape to be inserted over the marginal edges of a rear view mirror 12 of a motor vehicle from the bottom longitudinal edge of the mirror upwardly.

The base 13 of the frame will, in this position, engage the bottom longitudinal edge of the mirror while the vertical uprights 14 and 15 of the frame formed integral with the outer ends of the base 13 will engage the vertical ends of the mirror. This position is assumed due to the fact that the bracket 16 supports the mirror in a vertical plane in the normal position.

Formed integral with the rear upstanding flange of the channel shaped base 13 is the triangular shaped portion 17 which, at its apex, is formed integral with the split ring 18. Formed at the split ends of the ring 18 are the vertical portions 19 and 20 which, at their upper ends, are formed integral with the inner ends of the horizontal portions 21 and 22 respectively, which, at their outer ends, are formed integral with the upper edge of the rear flange of the channel shaped uprights 14 and 15.

Formed integral with the portions 21 and 22 above and in substantially the same plane with the vertical portions 19 and 20, are the vertically disposed ears 23 and 24 respectively, which are bent over the upper longitudinal edge of the mirror, as shown in Figure 1, to retain the holder on the mirror.

The stickers may be applied directly to the rear of the mirror in the space formed by the base uprights and vertical and ring portions, or pieces of transparent material 25 and 25' may be inserted in the frame in contact with the rear of the mirror to retain the stickers and other necessary articles in place.

In position, the split ring 18 surrounds the bracket 16, and is of sufficient diameter to receive the bracket, as shown in Figure 2. The spaced vertical portions 19 and 20 permit the bracket to be received intermediate these portions, so that the holder can be slid onto the mirror.

Thus a holder has been provided that will accomplish the objects of the invention, and possess the advantages outlined. It is believed the foregoing description will clearly point out the construction of the holder, and the manner in which it is mounted on the mirror. The removal of the holder is obtained by rebending the ears 23 and 24 in the opposite direction, and sliding it off of the mirror.

It is also to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A device of the character described, which is adapted to be mounted on the rear of a rear view mirror, comprising a U-shaped frame of channel formation, which is adapted to engage the bottom longitudinal edge and the vertical edges of the mirror, a central connecting portion for said frame formed integral with the bottom of said frame, said connecting portion having an open upper end, horizontal portions connecting the upper open ends of the central connecting portion and the upper ends of the frames and means formed on said horizontal portions for retaining said frame on said mirror.

2. The invention as in claim 1, wherein the channel formation of said frame provides flanges for the frame that are adapted to engage the front and rear of said mirror and said frame carries horizontal sections of transparent material intermediate the flanges of said frame engaging the rear of said mirror and the rear of said mirror.

RALPH T. HODGES, Sr.

REFERENCES CITED

The following references are of record in the file of this patent:

UNITED STATES PATENTS

| Number | Name | Date |
|---|---|---|
| 1,197,065 | Sand | Sept. 5, 1916 |
| 1,537,039 | Short | May 5, 1925 |
| 1,710,296 | Clark | Apr. 23, 1929 |
| 1,896,695 | Borovicka | Feb. 7, 1933 |
| 2,048,105 | Cobbs | July 21, 1936 |
| 2,156,351 | Paul | May 2, 1939 |
| 2,368,991 | Kopp | Feb. 6, 1945 |